(12) United States Patent
Shevade et al.

(10) Patent No.: US 11,595,347 B1
(45) Date of Patent: Feb. 28, 2023

(54) DUAL-STACK NETWORK ADDRESSING IN CLOUD PROVIDER NETWORK EDGE LOCATIONS

(71) Applicant: Amazon Technologies, Inc., Seattle, WA (US)

(72) Inventors: Upendra Bhalchandra Shevade, Washington, DC (US); Shridhar Kulkarni, Seattle, WA (US); Christopher Barclay, Seattle, WA (US); Ishwardutt Parulkar, San Francisco, CA (US); Dougal Stuart Ballantyne, Seattle, WA (US); Diwakar Gupta, Seattle, WA (US); Georgios Elissaios, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 271 days.

(21) Appl. No.: 17/112,714

(22) Filed: Dec. 4, 2020

(51) Int. Cl.
*H04L 61/256* (2022.01)
*H04W 8/26* (2009.01)
*H04L 101/659* (2022.01)

(52) U.S. Cl.
CPC ............ *H04L 61/256* (2013.01); *H04W 8/26* (2013.01); *H04L 2101/659* (2022.05)

(58) Field of Classification Search
CPC .......... H04L 61/256; H04L 2101/659; H04W 8/26
See application file for complete search history.

(56) References Cited

U.S. PATENT DOCUMENTS

| | | | | |
|---|---|---|---|---|
| 11,095,534 | B1* | 8/2021 | Dunsmore | .............. H04L 67/51 |
| 11,159,344 | B1* | 10/2021 | Shevade | ................ H04L 61/50 |
| 11,219,034 | B1* | 1/2022 | Dunsmore | .......... H04W 72/048 |
| 11,470,047 | B1* | 10/2022 | Shevade | .............. H04L 67/306 |
| 2018/0176130 | A1* | 6/2018 | Banerjee | ............. H04L 61/2557 |
| 2019/0387062 | A1* | 12/2019 | Enat | ...................... H04L 67/148 |
| 2021/0168027 | A1* | 6/2021 | Parulkar | ................. H04L 43/16 |
| 2021/0168052 | A1* | 6/2021 | Parulkar | ............. H04L 41/5041 |
| 2021/0168203 | A1* | 6/2021 | Parulkar | ............. H04L 67/1076 |
| 2022/0007437 | A1* | 1/2022 | Goenka | ................. H04L 63/083 |
| 2022/0061059 | A1* | 2/2022 | Dunsmore | ............ H04W 24/06 |

* cited by examiner

*Primary Examiner* — Douglas B Blair
(74) *Attorney, Agent, or Firm* — Nicholson De Vos Webster & Elliott, LLP

(57) ABSTRACT

Techniques for utilizing dual-stack network addressing for compute instances hosted in an edge location of a cloud provider network along with communications service provider (CSP) network addresses are described. A first network address is assigned to the compute instance from a pool of network addresses of the cloud provider network, and a second network address is associated with the compute instance that is provided by the CSP network. A gateway of the edge location is updated to direct packets addressed to the second network address to the compute instance via use of the first network address.

20 Claims, 12 Drawing Sheets

US 11,595,347 B1

DUAL-STACK NETWORK ADDRESSING IN CLOUD PROVIDER NETWORK EDGE LOCATIONS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various embodiments in accordance with the present disclosure will be described with reference to the drawings, in which.

DETAILED DESCRIPTION

Figure 1:
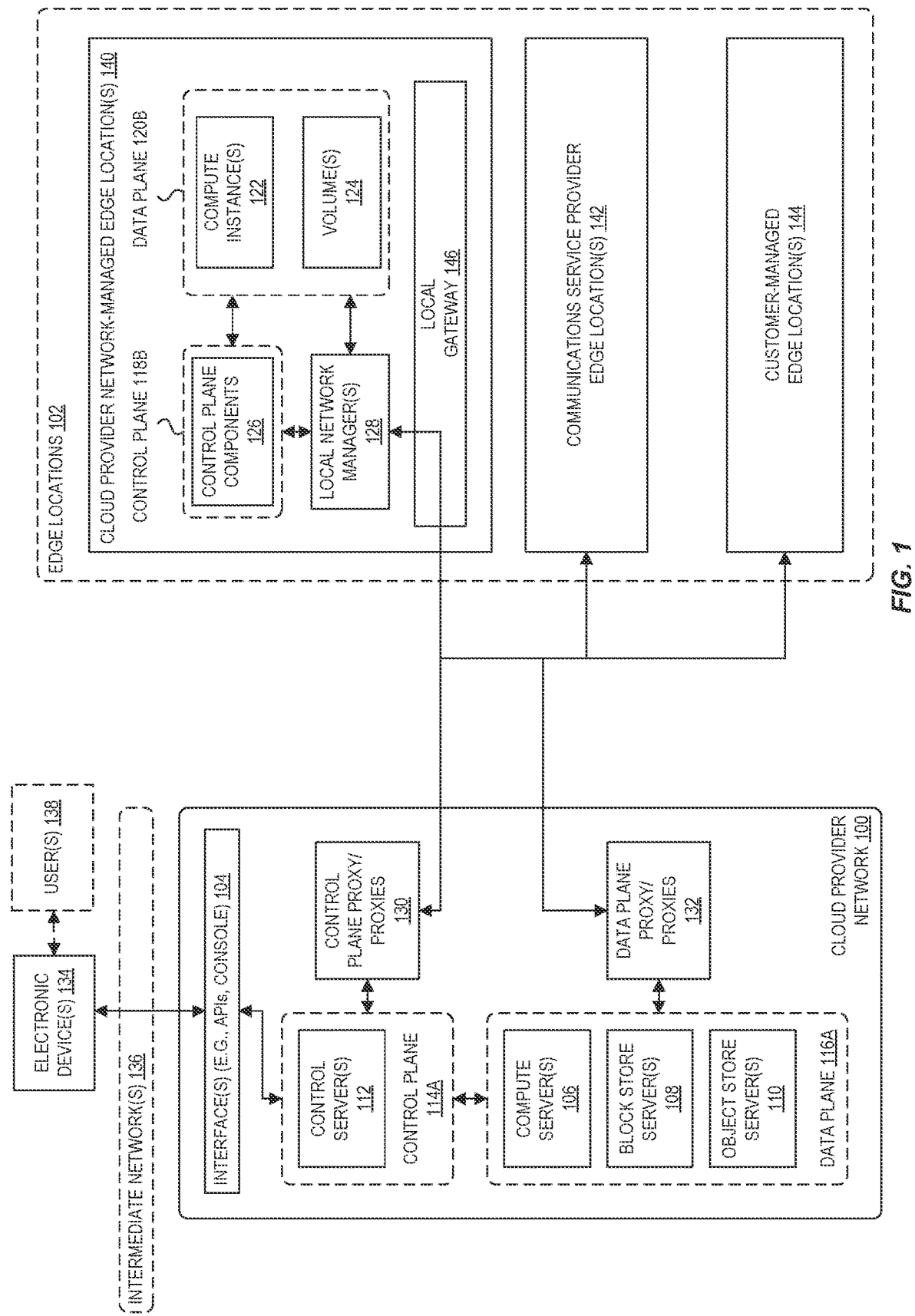
FIG. 1 illustrates an exemplary system including a cloud provider network and further including various edge locations of the cloud provider network according to some embodiments.

The present disclosure relates to methods, apparatus, systems, and non-transitory computer-readable storage media for dual-stack network addressing in cloud provider network edge locations connected to cellular communications service provider networks.

A cloud provider network may deploy resources within a location owned or operated by a communications service provider ("CSP") that is directed attached to (or incorporated within) a CSP network. Customers of the cloud provider network can use those resources to host compute instances (e.g., virtual machines). The deployment of those resources "within" the CSP network allows for very low latencies to be achieved between devices that obtain connectivity through the CSP network and the hosted instances (e.g., a mobile phone communicating with an application executed by a compute instance). The resources include a gateway that provides for connectivity between devices obtaining connectivity through the CSP network and instances hosted by the cloud provider network resources deployed within the CSP network.

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

In some embodiments, physical separate segments of a cloud provider network—referred to herein as an edge location ("EL") of the provider network—can be provisioned within a location or site that is separate from the cloud provider network. For example, a cloud provider network typically includes a physical network (e.g., sheet metal boxes, cables, rack hardware) referred to as the substrate. The substrate can be considered as a network fabric containing the physical hardware that runs the services of the provider network. In some implementations, an edge location may be an extension of the cloud provider network substrate formed by one or more servers located on-premise in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access an edge location via the cloud provider substrate or another network and may use the same application programming interfaces (APIs) to create and manage resources in the edge location as they would use to create and manage resources in the region of a cloud provider network.

As indicated above, one example type of edge location is one that is formed by servers located on-premise in a customer or partner facility. This type of substrate extension located outside of cloud provider network data centers can be referred to as an "outpost" of the cloud provider network. Another example type of edge location is one that is formed by servers located in a facility managed by the cloud provider but that includes data plane capacity controlled at least partly by a separate control plane of the cloud provider network.

In some embodiments, yet another example of an edge location is a network deployed within a communications service provider (CSP) network. CSPs generally include companies that have deployed networks through which end users obtain network connectivity. For example, CSPs can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). Thus, a cellular CSP may provide, at least partially, its users with wireless access (e.g., via a 4G or 5G or similar technology) to the internet or other services of the cellular CSP or another provider.

While traditional deployments of computing resources in data centers provide various benefits due to centralization, physical constraints such as the network distance and number of network hops between end user devices and those computing resources can prevent very low latencies from being achieved. By installing or deploying capacity within CSP networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, autonomous vehicles, and the like.

Thus, as used herein, the computing resources of the cloud provider network installed within a CSP site/network (or possibly other sites/networks) are sometimes also referred to as "cloud provider network edge locations" or simply "edge locations" in that they are closer to the "edge" where end users connect to a network than computing resources in a centralized data center. Such edge locations may include one or more networked computer systems that provide customers of the cloud provider network with computing resources to serve end users with lower latency than would otherwise be achievable if those compute instances were hosted in a more distant data center site. An edge location deployed in a CSP location/network may also be referred to as a "wavelength zone."

FIG. 1 illustrates an exemplary system including a cloud provider network and further including various edge locations of the cloud provider network according to some embodiments. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users (e.g., users 138) can connect to virtualized computing devices and other cloud provider network 100 resources and services using various interfaces 104 (e.g., APIs) via intermediate network(s) 136. An API refers to an interface and/or communication protocol between a client (e.g., an electronic device 134) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 106, a block store server 108, an object store server 110, a control server 112) can have an IP address in the substrate network. Hardware virtualization technology can enable multiple operating systems to run concurrently on a host computer, for example as virtual machines (VMs) on a compute server 106. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

As illustrated, the traffic and operations of the cloud provider network substrate may broadly be subdivided into two categories in various embodiments: control plane traffic carried over a logical control plane 114A and data plane operations carried over a logical data plane 116A. While the data plane 116A represents the movement of user data through the distributed computing system, the control plane 114A represents the movement of control signals through the distributed computing system. The control plane 114A generally includes one or more control plane components or services distributed across and implemented by one or more control servers 112. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 116A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of server devices from the data plane server devices, and control plane traffic and data plane traffic may be sent over separate/distinct networks. In some embodiments, control plane traffic and data plane traffic can be supported by different protocols. In some embodiments, messages (e.g., packets) sent over the cloud provider network 100 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 116A can include one or more compute servers 106, which may be bare metal (e.g., single tenant) or may be virtualized by a hypervisor to run multiple VMs (sometimes referred to as "instances") or microVMs for one or more customers. These compute servers 106 can support a virtualized computing service (or "hardware virtualization service") of the cloud provider network. The virtualized computing service may be part of the control plane 114A, allowing customers to issue commands via an interface 104 (e.g., an API) to launch and manage compute instances (e.g., VMs, containers) for their applications. The virtualized computing service may offer virtual compute instances with varying computational and/ or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 116A can also include one or more block store servers 108, which can include persistent storage for storing volumes of customer data as well as software for managing these volumes. These block store servers 108 can support a managed block storage service of the cloud provider network. The managed block storage service may be part of the control plane 114A, allowing customers to issue commands via the interface 104 (e.g., an API) to create and manage volumes for their applications running on compute instances. The block store servers 108 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 116A can also include one or more object store servers 110, which represent another type of storage within the cloud provider network. The object storage servers 110 include one or more servers on which data is stored as objects within resources referred to as buckets (e.g., an object somewhat analogous to file system folders or directories) and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge location 102 provides resources and services of the cloud provider network 100 within a separate network, thereby extending functionality of the cloud provider network 100 to new locations (e.g., for reasons related to latency in communications with customer devices, legal compliance, security, etc.). As indicated, such edge locations 102 can include cloud provider network-managed edge locations 140 (e.g., formed by servers located in a cloud provider-managed facility separate from those associated with the cloud provider network 100), communications service provider edge locations 142 (e.g., formed by servers associated with communications service provider facilities), customer-managed edge locations 144 (e.g., formed by servers located on-premise in a customer or partner facility), among other possible types of substrate extensions.

As illustrated in the example edge location 140, an edge location 102 can similarly include a logical separation between a control plane 118B and a data plane 120B, respectively extending the control plane 114A and data plane 116A of the cloud provider network 100. The edge location 102 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within an edge location 102. As described above, the cloud provider network 100 may offer a set of predefined instance types, each having varying types and quantities of underlying hardware resources. Each instance type may also be offered in various sizes. In order to enable customers to continue using the same instance types and sizes in an edge location 102 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the edge location servers. This can improve utilization of computing resources within the edge location by allowing for better packing of running instances on servers, and also provides a seamless experience regarding instance usage across the cloud provider network 100 and the cloud provider network edge location.

As illustrated, the edge location servers can host one or more compute instances 122. Compute instances 122 can be VMs, or containers that package up code and all its dependencies so an application can run quickly and reliably across computing environments (e.g., including VMs). In addition, the servers may host one or more data volumes 124, if desired by the customer. In the region of a cloud provider network 100, such volumes may be hosted on dedicated block store servers. However, due to the possibility of having a significantly smaller capacity at an edge location 102 than in the region, an optimal utilization experience may not be provided if the edge location includes such dedicated block store servers. Accordingly, a block storage service may be virtualized in the edge location 102, such that one of the VMs runs the block store software and stores the data of a volume 124. Similar to the operation of a block storage service in the region of a cloud provider network 100, the volumes 124 within an edge location 102 may be replicated for durability and availability. The volumes may be provisioned within their own isolated virtual network within the edge location 102. The compute instances 122 and any volumes 124 collectively make up a data plane extension 120B of the provider network data plane 116A within the edge location 102.

The servers within an edge location 102 may, in some implementations, host certain local control plane components 126, for example, components that enable the edge location 102 to continue functioning if there is a break in the connection back to the cloud provider network 100. Examples of these components include a migration manager that can move compute instances 122 between edge location servers if needed to maintain availability, and a key value data store that indicates where volume replicas are located. However, generally the control plane 118B functionality for an edge location remains in the cloud provider network 100 to allow customers to use as much resource capacity of the edge location as possible.

Server software running at an edge location 102 may be designed by the cloud provider to run on the cloud provider substrate network, and this software may be enabled to run unmodified in an edge location 102 by using local network manager(s) 128 to create a private replica of the substrate network within the edge location (a "shadow substrate"). The local network manager(s) 128 can run on edge location 102 servers and bridge the shadow substrate with the edge location 102 network, for example, by acting as a virtual private network (VPN) endpoint or endpoints between the edge location 102 and the proxies 130, 132 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 128 allow resources in the edge location 102 to seamlessly communicate with resources in the cloud provider network 100. In some implementations, a single local network manager can perform these actions for all servers hosting compute instances 122 in an edge location 102. In other implementations, each of the server hosting compute instances 122 may have a dedicated local network manager. In multi-rack edge locations, inter-rack communications can go through the local network managers, with local network managers maintaining open tunnels to one another.

Edge locations can utilize secure networking tunnels through the edge location 102 network to the cloud provider network 100, for example, to maintain security of customer data when traversing the edge location 102 network and any other intermediate network (which may include the public internet). Within the cloud provider network 100, these tunnels are composed of virtual infrastructure components including isolated virtual networks (e.g., in the overlay network), control plane proxies 130, data plane proxies 132, and substrate network interfaces. Such proxies may be implemented as containers running on compute instances. In some embodiments, each server in an edge location 102 that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some embodiments, a direct connection between an edge location 102 and the cloud provider network 100 can be used for control and data plane communications. As compared to a VPN through other networks, the direct connection can provide constant bandwidth and more consistent network performance because of its relatively fixed and stable network path.

A control plane (CP) proxy 130 can be provisioned in the cloud provider network 100 to represent particular host(s) in an edge location. CP proxies are intermediaries between the control plane 114A in the cloud provider network 100 and control plane targets in the control plane 118B of edge location 102. That is, CP proxies 130 provide infrastructure for tunneling management API traffic destined for edge location servers out of the region substrate and to the edge location 102. For example, a virtualized computing service of the cloud provider network 100 can issue a command to a VMM of a server of an edge location 102 to launch a compute instance 122. A CP proxy maintains a tunnel (e.g., a VPN) to a local network manager 128 of the edge location. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at an edge location 102 or may be able to manage control plane traffic for multiple servers in the same edge location.

A data plane (DP) proxy 132 can also be provisioned in the cloud provider network 100 to represent particular server(s) in an edge location 102. The DP proxy 132 acts as a shadow or anchor of the server(s) and can be used by services within the cloud provider network 100 to monitor health of the host (including its availability, used/free compute and capacity, used/free storage and capacity, and network bandwidth usage/availability). The DP proxy 132 also allows isolated virtual networks to span edge locations 102 and the cloud provider network 100 by acting as a proxy for server(s) in the cloud provider network 100. Each DP proxy 132 can be implemented as a packet-forwarding compute instance or container. As illustrated, each DP proxy 132 can maintain a VPN tunnel with a local network manager 128 that manages traffic to the server(s) that the DP proxy 132 represents. This tunnel can be used to send data plane traffic between the edge location server(s) and the cloud provider network 100. Data plane traffic flowing between an edge location 102 and the cloud provider network 100 can be passed through DP proxies 132 associated with that edge location. For data plane traffic flowing from an edge location 102 to the cloud provider network 100, DP proxies 132 can receive encapsulated data plane traffic, validate it for correctness, and allow it to enter into the cloud provider network 100. DP proxies 132 can forward encapsulated traffic from the cloud provider network 100 directly to an edge location 102.

Local network manager(s) 128 can provide secure network connectivity with the proxies 130, 132 established in the cloud provider network 100. After connectivity has been established between the local network manager(s) 128 and the proxies, customers may issue commands via the interface 104 to instantiate compute instances (and/or perform other operations using compute instances) using edge location resources in a manner analogous to the way in which such commands would be issued with respect to compute instances hosted within the cloud provider network 100. From the perspective of the customer, the customer can now seamlessly use local resources within an edge location (as well as resources located in the cloud provider network 100, if desired). The compute instances set up on a server at an edge location 102 may communicate both with electronic devices located in the same network as well as with other resources that are set up in the cloud provider network 100, as desired. A local gateway 146 can be implemented to provide network connectivity between an edge location 102 and a network associated with the extension (e.g., a communications service provider network in the example of an edge location 142).

There may be circumstances that necessitate the transfer of data between the object storage service and an edge location 102. For example, the object storage service may store machine images used to launch VMs, as well as snapshots representing point-in-time backups of volumes. The object gateway can be provided on an edge location server or a specialized storage device, and provide customers with configurable, per-bucket caching of object storage bucket contents in their edge location to minimize the impact of edge location-region latency on the customer's workloads. The object gateway can also temporarily store snapshot data from snapshots of volumes in the edge location and then sync with the object servers in the region when possible. The object gateway can also store machine images that the customer designates for use within the edge location or on the customer's premises. In some implementations, the data within the edge location may be encrypted with a unique key, and the cloud provider can limit keys from being shared from the region to the edge location for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge location bucket can be created (on the object store servers) to store snapshot and machine image data using the edge location encryption key.

In the manner described above, an edge location 102 provides the resources and services of the cloud provider network outside of a traditional cloud provider data center and closer to user devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones" due to being placed "local" to many end users and thus may be placed closer to large population, industry, and IT centers In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

Figure 2:
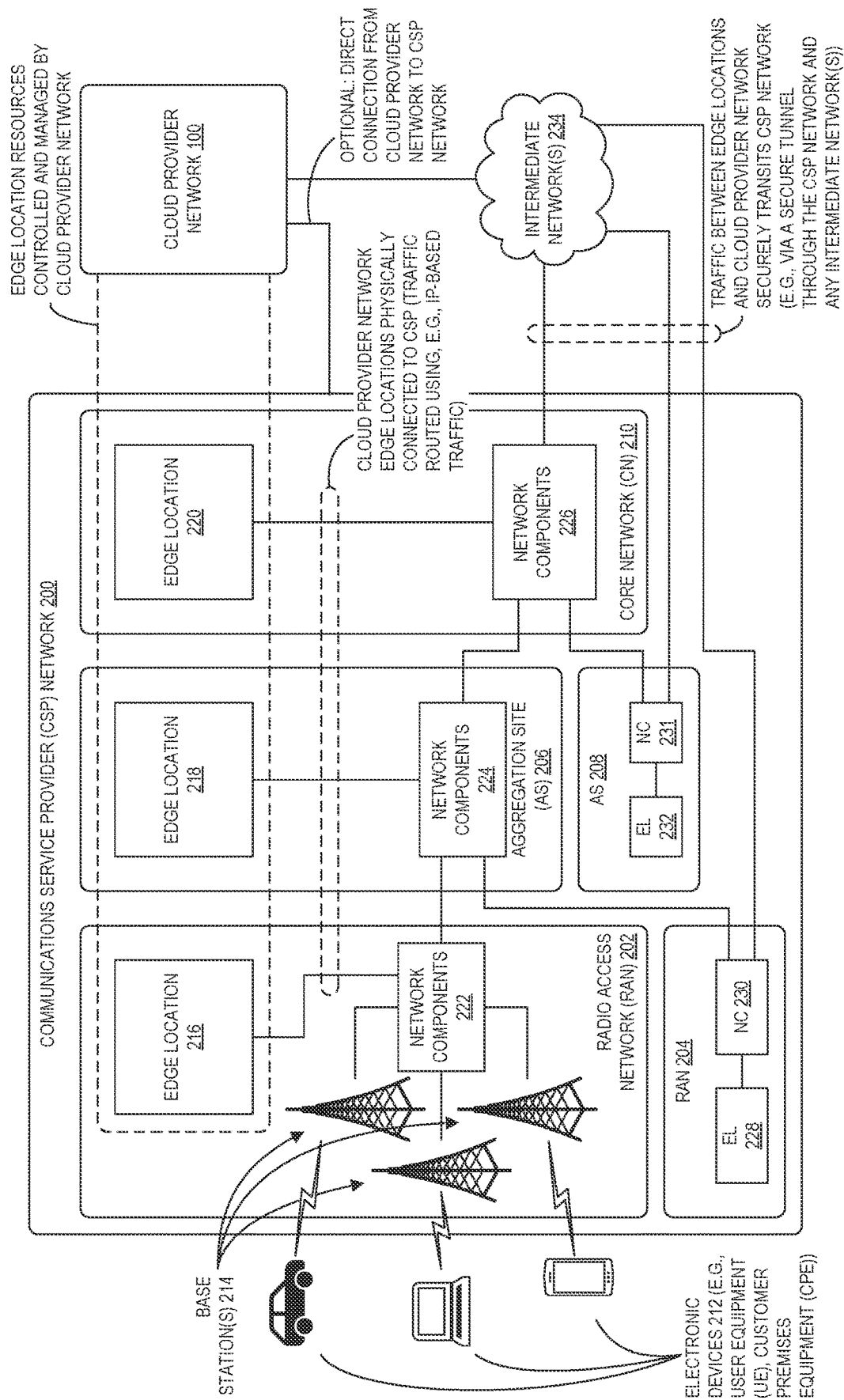
FIG. 2 illustrates an exemplary system in which cloud provider network substrate extensions are deployed within a communications service provider network according to some embodiments.

FIG. 2 illustrates an exemplary system in which cloud provider network edge locations are deployed within a communications service provider network according to some embodiments. A communications service provider (CSP) network 200 generally includes a downstream interface to end user electronic devices and an upstream interface to other networks (e.g., the internet). In this example, the CSP network 200 is a wireless "cellular" CSP network that includes radio access networks (RAN) 202, 204, aggregation sites (AS) 206, 208, and a core network (CN) 210. The RANs 202, 204 include base stations (e.g., NodeBs, eNodeBs, gNodeBs) that provide wireless connectivity to electronic devices 212. The core network 210 typically includes functionality related to the management of the CSP network (e.g., billing, mobility management, etc.) and transport functionality to relay traffic between the CSP network and other networks. Aggregation sites 206, 208 can serve to consolidate traffic from many different radio access networks to the core network and to direct traffic originating from the core network to the various radio access networks.

From left to right in FIG. 2, end user electronic devices 212 wirelessly connect to base stations (or radio base stations) 214 of a radio access network 202. Such electronic devices 212 are sometimes referred to as user equipment (UE) or customer premises equipment (CPE). Data traffic is often routed through a fiber transport network consisting of multiple hops of layer 3 routers (e.g., at aggregation sites) to the core network 210. The core network 210 is typically housed in one or more data centers. For data traffic destined for locations outside of the CSP network 200, the network components 222-226 typically include a firewall through which traffic can enter or leave the CSP network 200 to external networks such as the internet or a cloud provider network 100. Note that in some embodiments, the CSP network 200 can include facilities to permit traffic to enter or leave from sites further downstream from the core network 210 (e.g., at an aggregation site or RAN).

Edge locations 216-220 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, edge locations 216, 218, and 220 are in communication with a cloud provider network 100.

Typically, the further—e.g., in terms of network hops and/or distance—an edge location is from the cloud provider network 100 (or closer to electronic devices 212), the lower the network latency is between computing resources within the edge location and the electronic devices 212. However, physical site constraints often limit the amount of edge location computing capacity that can be installed at various points within the CSP or determine whether computing capacity can be installed at various points at all. For example, an edge location sited within the core network 210 can typically have a much larger footprint (in terms of physical space, power requirements, cooling requirements, etc.) than an edge location sited within the RAN 202, 204.

The installation or siting of edge locations within a CSP network can vary subject to the particular network topology or architecture of the CSP network. As indicated in FIG. 2, edge locations can generally be connected anywhere the CSP network can break out packet-based traffic (e.g., IP based traffic). Additionally, communications between a given edge location and the cloud provider network 100 may securely transit at least a portion of the CSP network 200 (e.g., via a secure tunnel, virtual private network, etc.), and in some cases a "dedicated" or "direct" private connection may be used between the edge location and the cloud provider network (or between the CSP network and the cloud provider network) such that the traffic does not transit the public internet—e.g., by physically coupling the two networks together at a particular site, such as using a fiberoptic link, ethernet link, a link aggregation group (LAG), or the like. In the illustrated example, the network components 222 facilitate the routing of data traffic to and from an edge location 216 integrated with the RAN 202, the network components 224 facilitate the routing of data traffic to and from an edge location 218 integrated with the AS 206, and the network components 226 facilitate the routing of data traffic to and from an edge location 220 integrated with the CN 210. Network components 222-226 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some embodiments, traffic between an edge location 228 and the cloud provider network 100 can be broken out of the CSP network 200 without routing through the core network 210. For example, network components 230 of a RAN 204 can be configured to route traffic between an edge location 216 of the RAN 204 and the cloud provider network 100 without traversing an aggregation site or core network 210. As another example, network components 231 of an aggregation site 208 can be configured to route traffic between an edge location 232 of the aggregation site 208 and the cloud provider network 100 without traversing the core network 210. The network components 230, 231 can include a gateway or router having route data to direct traffic from the edge location destined for the cloud provider network 100 to the cloud provider network 100 (e.g., through a direct connection or an intermediate network 234) and to direct traffic from the cloud provider network 100 destined for the edge location to the edge location.

In some embodiments, edge locations can be connected to more than one CSP network. For example, when two CSPs share or route traffic through a common point, an edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 2 includes radio access networks, aggregation sites, and a core network, the architecture of a CSP network can vary in naming and structure across generations of wireless technology, between different CSPs, as well as between wireless and fixed-line CSP networks. Additionally, while FIG. 2 illustrates several locations where an edge location can be sited within a CSP network, other locations are possible (e.g., at a base station).

Figure 3:
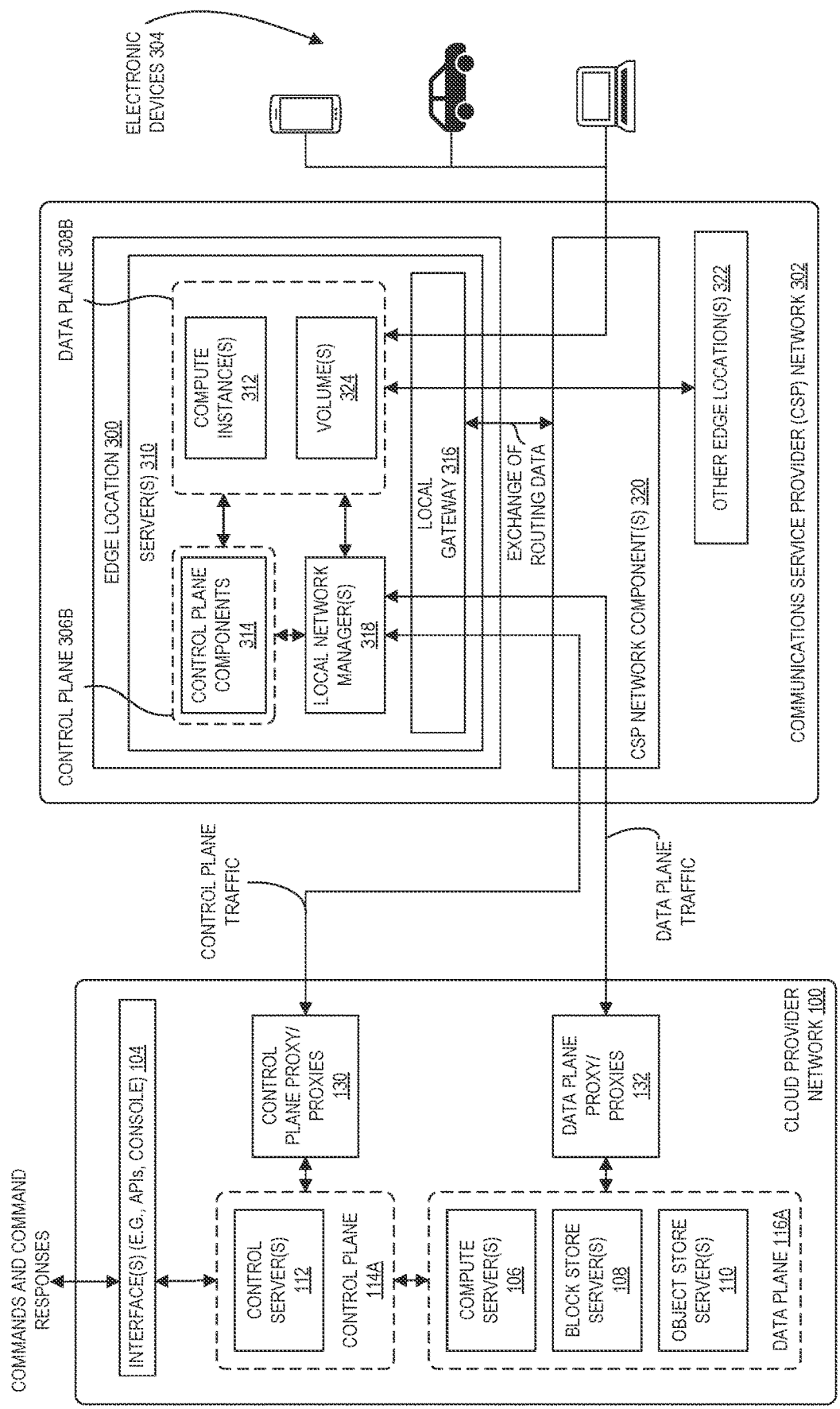
FIG. 3 illustrates in greater detail exemplary components of and connectivity between a cloud provider network and an edge location within a communications service provider network according to some embodiments.

FIG. 3 illustrates in greater detail exemplary components of and connectivity between a cloud provider network and an edge location within a communications service provider network according to some embodiments. An edge location 300 provides resources and services of the cloud provider network within a CSP network 302 thereby extending functionality of the cloud provider network 100 to be closer to end user devices 304 connected to the CSP network.

The edge location 300 similarly includes a logical separation between a control plane 306B and a data plane 308B, respectively extending the control plane 114A and data plane 116A of the cloud provider network 100. The edge location 300 may be pre-configured, e.g. by the cloud provider network operator, with an appropriate combination of hardware with software and/or firmware elements to support various types of computing-related resources, and to do so in a manner that mirrors the experience of using the cloud provider network. For example, one or more edge location servers 310 can be provisioned by the cloud provider for deployment within the CSP network 302.

The server devices 310 within an edge location 300 may, in some implementations, host certain local control plane components 314, for example, components that enable the edge location 300 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 306B functionality for an edge location 300 will remain in the cloud provider network 100 in order to allow customers to use as much resource capacity of the edge location as possible.

As illustrated, the edge location servers 310 can host compute instances 312. Compute instances can be VMs, microVMs, or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some embodiments, the execution of edge-optimized compute instances is supported by a lightweight virtual machine manager (VMM) running on the servers 310 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 310 may host one or more data volumes 324, if desired by the customer. The volumes may be provisioned within their own isolated virtual network within the edge location 300. The compute instances 312 and any volumes 324 collectively make up a data plane extension 308B of the provider network data plane 116A within the edge location 300.

A local gateway 316 can be implemented to provide network connectivity between the edge location 300 and the CSP network 302. The cloud provider can configure the local gateway 316 with an IP address on the CSP network 302 and to exchange routing data (e.g., via the Border Gateway Protocol (BGP)) with the CSP network components 320. The local gateway 316 can include one or more route tables that control the routing of inbound traffic to the edge location 300 and outbound traffic leaving the edge location 300. The local gateway 316 can also support multiple VLANs in cases where the CSP network 302 uses separate VLANs for different portions of the CSP network 302 (e.g., one VLAN tag for the wireless network and another VLAN tag for a fixed network).

In some embodiments of an edge location 300, the extension includes one or more switches, sometimes referred to top of rack (TOR) switches (e.g., in rack-based embodiments). The TOR switches are connected to CSP network routers (e.g., CSP network components 320), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows an edge location management entity of the control plane of the cloud provider network 100 to add more peering links to an edge location without adjustments to routing. Each of the TOR switches can establish eBGP sessions with the carrier PE or SD-WAN routers. The CSP can provide a private Autonomous System Number (ASN) for the edge location and an ASN of the CSP network 302 to facilitate the exchange of routing data.

Data plane traffic originating from the edge location 300 can have a number of different destinations. For example, traffic addressed to a destination in the data plane 116A of the cloud provider network 100 can be routed via the data plane connection between the edge location 300 and the cloud provider network 100. This data plane connection may be formed over a "direct" connection between the edge location 300 and the cloud provider network 100, which may involve configuring a network path (potentially using physical devices located at the edge location 300 site, which may or may not be under the control of the CSP) that is reserved for communications between the edge location 300 and the cloud provider network 100, and thus the traffic does not (or does not substantially) traverse the general CSP network. Such a direct connection may be used to pass both data plane and control plane traffic between these locations, or multiple direct connections can be used where each passes one type of traffic (e.g., one or more for only data plane traffic, one or more only for control plane traffic), or the like. Thus, the local network manager 318 can receive a packet from a compute instance 312 addressed to, for example, another compute instance in the cloud provider network 100 and encapsulate the packet with a destination as the substrate IP address of the server hosting the other compute instance before sending it to the cloud provider network 100 (e.g., via the direct connection or similar tunnel). For traffic from a compute instance 312 addressed to another compute instance hosted in another edge location 322, the local network manager 318 can encapsulate the packet with a destination as the IP address assigned to the other edge location 322, thereby allowing the CSP network components 320 to handle the routing of the packet. Alternatively, if the CSP network components 320 do not support inter-edge location traffic, the local network manager 318 can address the packet to a relay in the cloud provider network 100 that can send the packet to the other edge location 322 via its data plane connection (not shown) to the cloud provider network 100. Similarly, for traffic from a compute instance 312 address to a location outside of the CSP network 302 or the cloud provider network 100 (e.g., on the internet), if the CSP network components 320 permit routing to the internet, the local network manager 318 can encapsulate the packet with a source IP address corresponding to the IP address in the carrier address space assigned to the compute instance 312.

Otherwise, the local network manager 318 can send the packet to an Internet Gateway in the cloud provider network 100 that can provide internet connectivity for the compute instance 312. Thus, in some embodiments, when network traffic is to be sent from the edge location 300 to an entity within the broader internet (e.g., not within the cloud provider network 100 or CSP network 302) the traffic may be sent from the edge location 300 to the cloud provider network 100 (e.g., via a direct connection) and then sent to the final destination (e.g., via the internet). For traffic from a compute instance 312 addressed to an electronic device 304, the local gateway 316 can use Network Address Translation (NAT) to change the source IP address of the packet from an address in an address space of the cloud provider network to an address space of the carrier network.

The local gateway 316, local network manager(s) 318, and other local control plane components 314 may run on the same servers 310 that host compute instances 312, may run on a dedicated processor (e.g., on an offload card) integrated with edge location servers 310, or can be executed by servers separate from those that host customer resources.

Figure 4:
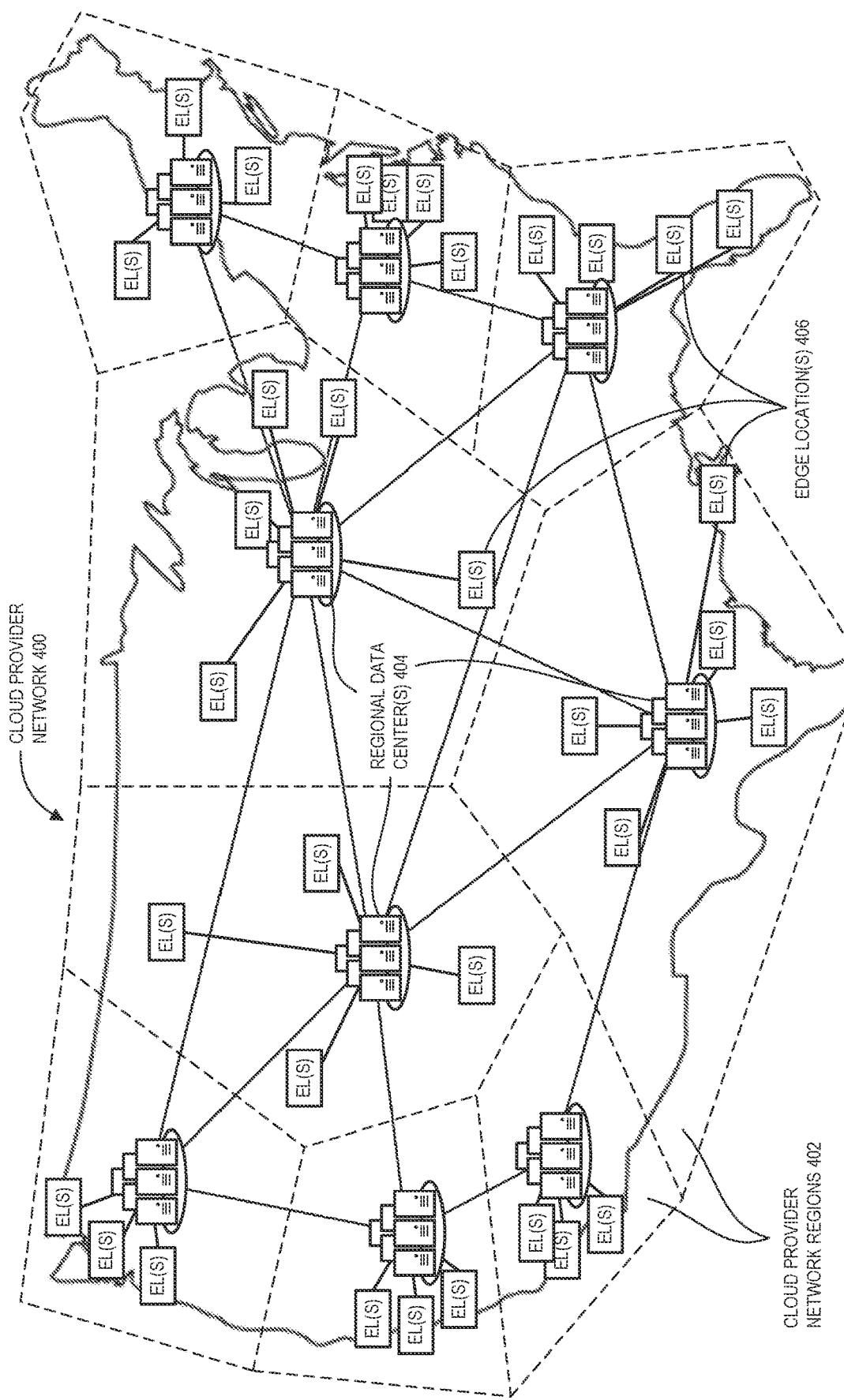
FIG. 4 illustrates an exemplary cloud provider network including geographically dispersed edge locations (or "edge locations") according to some embodiments.

FIG. 4 illustrates an exemplary cloud provider network including geographically dispersed edge locations (or "provider substrate extensions") according to some embodiments. In this example, the edge locations and provider network regions are shown with relation to a map of the United States; however, it is to be understood that other locations of the world are equally applicable and further, that the exemplary locations of these regions and edge locations may not be indicative of reality as they are simplified for ease of understanding.

As illustrated, a cloud provider network 400 can be formed as a number of regions 402, where a region is a separate geographical area in which the cloud provider has one or more data centers 404. Each region 402 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 406 can be much higher. Such widespread deployment of edge locations 406 can provide low-latency connectivity to the cloud for a much larger group of end user devices (in comparison to those that happen to be very close to a regional data center). In some embodiments, each edge location 406 can be peered to some portion of the cloud provider network 400 (e.g., a parent availability zone or regional data center). Such peering allows the various components operating in the cloud provider network 400 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

An edge location 406 can be structured in several ways. In some implementations, an edge location 406 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers, instead of the edge location infrastructure described herein.

Figure 5:
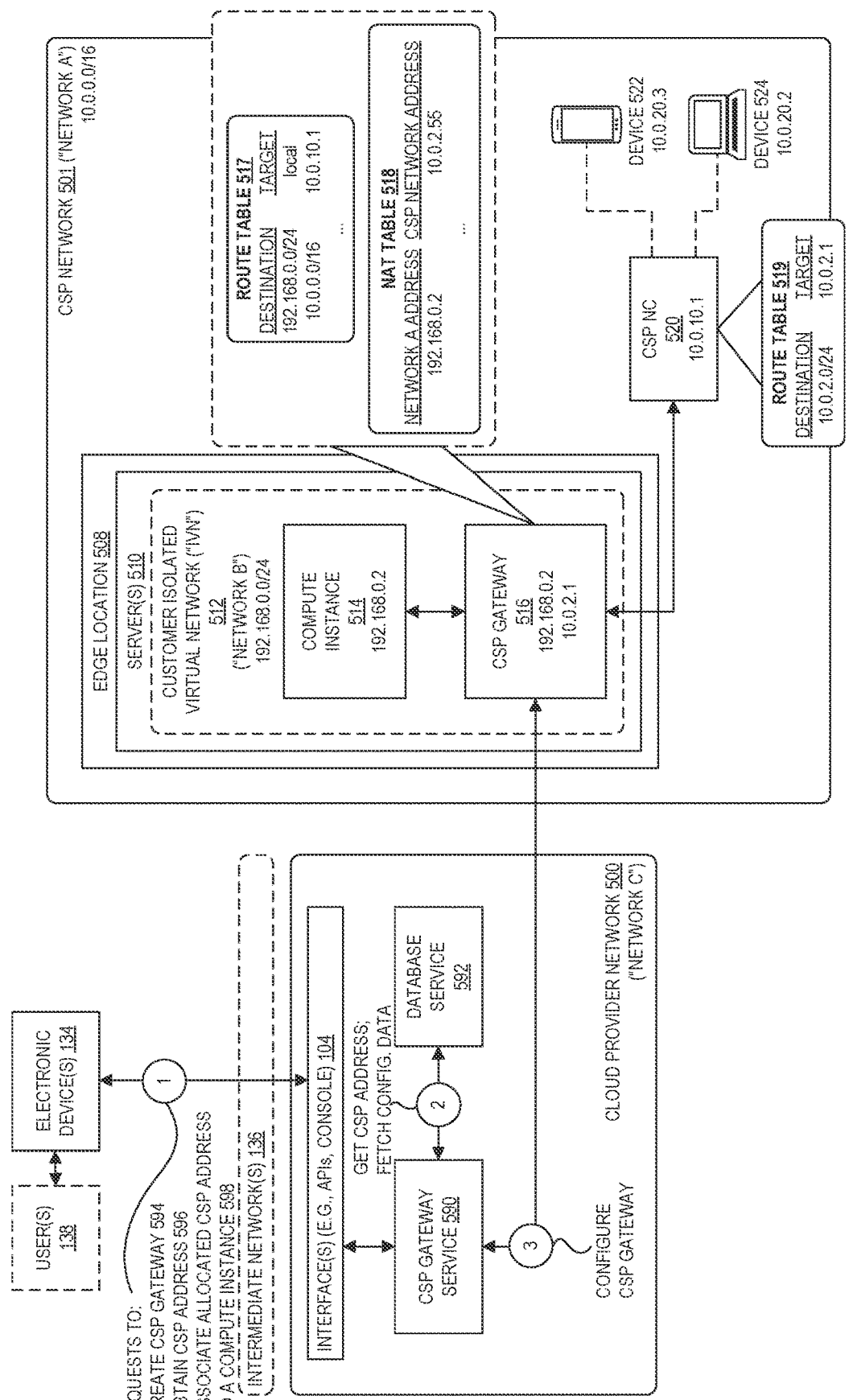
FIG. 5 is a diagram illustrating an environment in which users establish connectivity between compute instances and a communications service provider network according to some embodiments.

FIG. 5 is a diagram illustrating an environment in which users establish connectivity between compute instances and a communications service provider network according to some embodiments. Because edge locations may be connected to multiple CSPs or a given CSP may have multiple networks or network slices (e.g., a 4G network and a 5G network), and because each CSP or CSP network may have a different configuration, the cloud provider network offers a new type of gateway that abstracts away the underlying configuration details of a particular CSP network from the customer yet allows the customer to easily establish connectivity to the available CSP network(s). The CSP gateway may be implemented as a new gateway type for customer isolated virtual networks ("IVNs") to establish connectivity to CSP networks. The CSP gateway may be implemented alongside other types of gateways such as an internet gateway (e.g., to facilitate routing from compute instances of the IVN to the internet) and a VPN gateway (e.g., to facilitate routing between the IVN and another customer network such as an on-premise network).

As illustrated, a customer (e.g., a user 138) has launched a compute instance 514 hosted by a server 510 of an edge location 508 (or edge location) that extends a cloud provider network 500 within a CSP network 501, also referred to as "Network A." The compute instance 514 is connected to an isolated virtual network ("IVN") 512, referred to here as "Network B" and which may be implemented as an overlay network on the substrate of the cloud provider network 500, referred to here as "Network C." For example, the IVN 512 may have use a private block of IP addresses—192.168.0.0/24—that can be used to address devices on the IVN 512 such as the compute instance 514, while a local network manager (not shown) performs the encapsulation and decapsulation of packets respectively sent from and to devices on the IVN 512 within packets addressed to devices (e.g., servers 510) on the cloud provider network 500 substrate. Here, the compute instance 514 has been assigned the IP address 192.168.0.2.

As part of deploying the edge location 508 within the CSP network 501, the CSP can allocate some pool of network addresses from the CSP network 501 for use by the edge location 508. In this example, the CSP network address range 10.0.2.0/24 is assigned to the edge location 508 (some larger range may be assigned to all edge locations deployed within the CSP network and distributed out to the various edge locations by the cloud provider network). The edge location 508 can advertise those addresses to the CSP network 501. For example, a local gateway (not shown) can advertise the allocated block of addresses via BGP to the CSP network 501.

Given the above environment, the numbered circles "1" through "3" illustrate an exemplary process that includes a user requesting a gateway to provide connectivity between the compute instance 514 and the CSP network 501.

At circle "1," the user 138 generates a request 594 to create a CSP gateway using an electronic device 134. As indicated above, communications between electronic device(s) 134 and the provider network 100, such as a request to create a CSP gateway, can be routed through interface(s) 104, such as through use of application programming interface (API) calls, via a console implemented as a website or application, and so forth. In addition to serving as a frontend to control plane services, the interface(s) 104 can perform operations such as verifying the identity and permissions of the user initiating a request, evaluating the request and routing it to the appropriate control plane services, and the like. The request 594 can include an identifier of the IVN in which to create the CSP gateway such as IVN 512. Upon receipt of the request, a CSP gateway service 590 can create a CSP gateway 516 as part of the specified IVN, assign an IP address within the IVN 512 range to the CSP gateway 516 (e.g., 192.168.0.1), and return an identifier, such as the IP address, to the electronic device 134.

Note that the customer IVN 512 may include a router and associated route table. The route table can include a default entry for IP addresses within the private range of the customer IVN (e.g., route packets destined for 192.168.0.0/24 locally), and the user 138 can add another entry for packets that do not satisfy the default route to the CSP gateway 516 (e.g., route packets destined for 0.0.0.0/0 to the CSP gateway).

Also as indicated at circle "1," the user 138 generates a request 596 to obtain a CSP network address from the pool of CSP network addresses. The request 596 can include an identifier of the particular CSP network address pool from which to allocate an address. For example, the request may be for an IP address for Carrier A's 4G network, Carrier A's 5G network, Carrier B's network, etc. Using the identifier, the CSP gateway service 590 allocates one of the available addresses from the associated pool to the customer and records that allocation. The CSP gateway service 590 can track the status of addresses in the pool (e.g., whether or not allocated) in a database provided by a database service 592 or other data store, as indicated at circle "2." The CSP gateway service 590 can return the allocated IP address (or an identifier of such) to the electronic device 134. In this example, the CSP gateway service 590 allocates the address 10.0.2.55 from the 10.0.2.0/24 pool.

Also as indicated at circle "1," the user 138 generates a request 598 to associate an allocated IP address with a particular compute instance. The request 598 can include an instance identifier and the IP address or IP address identifier. In this example, the request identifies the compute instance 514 and the allocated 10.0.2.55 address. Using the identifier, the CSP gateway service 590 configures the CSP gateway 516 to establish connectivity between the compute instance 514 and the CSP network 501. Such connectivity can allow devices such as device 522 and device 524 to connect to the compute instance 514 through the CSP network 501 thereby taking advantage of the low latency provided by the deployment of the edge location 508 within the CSP network 501.

Because various CSP networks or network slices can have a variety of network configuration parameters, the CSP gateway service 590 obtains configuration data for the particular CSP network from a database provided by a database service 592 or other data store, as indicated at circle "2." The database can include, for each CSP network, information such as the IP address of the network component through which traffic entering and leaving a given edge location is routed, whether the CSP network has a particular vlan tag, whether the CSP network is reached through a particular interface of the edge location (e.g., a first network adapter or a second network adapter), etc. In this example, the configuration data indicates that the edge location 508 is connected to a CSP network component 520 (e.g., a gateway or router) having an IP address 10.0.10.1.

At circle "3" in FIG. 5, the CSP gateway service 590 sends one or more commands to configure the CSP gateway 516. Such commands may be sent as control plane traffic via a proxy (e.g., proxy 130). Here, connectivity is established by configuring a route table 517 and a network address translation (NAT) table 518 of the CSP gateway 516. In particular, the CSP gateway service 590 creates or updates the route table 517 with a route for packets to the 10.0.0.0/16 range to the CSP network component 520 at 10.0.10.1, thus permitting messages sent from the compute instance 514 to, for example, device 522 or device 524, to be routed via the CSP gateway 516 and CSP network 501. The route table 517 further includes a local route to indicate packets addressed to destinations within the range of the IVN 512 are routed within the IVN 512. Additionally, the CSP gateway service 590 creates or updates the NAT table 518 to associate the allocated IP address (10.0.2.55) with the compute instance 514 (192.168.0.2), thus permitting messages sent from the CSP network (e.g., from device 522 or device 524) to the 10.0.2.55 address to reach the compute instance 514. Note that the CSP network component 520 includes an entry in its route table 519 to route messages destined for the 10.0.2.0/24 range to the CSP gateway (10.0.2.1). Such an entry may be based off an exchange of routing information (e.g., via BGP).

Although IP version 4 (IPv4) addressing is illustrated in FIG. 5, IP version 6 (IPv6) addressing may also be used. Additionally, in some embodiments, the CSP gateway bridges between IP version 4 and IP version 6. For example, the IVN of a compute instance may use IPv4 addressing while a CSP network may use IPv6 addressing or vice versa.

Note that the above description assumed the customer compute instance 514 was already running before establishing connectivity to the CSP network 501 via the CSP gateway 516. In other embodiments, the customer may request the launch of a compute instance (e.g., via a hardware virtualization service) with one or more configuration parameters (e.g., as described with reference to circle "1") to automatically connect the launched instance to a specified CSP network via a CSP gateway. Additionally, one or more of the requests 594, 596, and/or 598 may be combined. For example, a single request may be used to obtain and assign an address for a particular CSP network address to an identified compute instance.

In some embodiments, the customer can configure the CSP gateway to permit or deny certain kinds of traffic. For example, the customer might specify that the CSP gateway is to only permit outbound traffic from a compute instance to the CSP network (e.g., the compute instance 514 connects to the device 522). As another example, the customer might specify that the CSP gateway is to only permit inbound traffic (e.g., the device 522 connects to the compute instance 514).

In the case where a separate CSP gateway is implemented for each customer IVN, the CSP gateway may have multiple network addresses—e.g., one on the customer IVN and one or more for each of the connected CSP networks. Because the number of addresses on the customer IVN and CSP network(s) are finite, the CSP gateways for multiple (or all) customer IVNs hosted by an edge location may be implemented by a common component.

As disclosed herein, embodiments can implement IPv6 addressing within edge locations, the provider network, and/or in the CSP networks. As one example, embodiments disclosed herein may utilize IPv6 under a dual-stack approach in which IPv4 and IPv6 are both used in a side-by-side manner FIG. 6 is a diagram illustrating another implementation for connectivity between compute instances and communications service provider networks according to some embodiments.

IPv6 was developed by the Internet Engineering Task Force (IETF) to deal with the long-anticipated problem of IPv4 address exhaustion. For example, many expect an order of magnitude increase in the numbers of connected devices in the near future, e.g., via 5G network rollouts. However, despite the relatively long amount of time that IPv6 has existed, switchover to the use of this protocol has been slow. Expensive network infrastructure, the lack of benefit for early adopters, and incompatibility with existing systems all contribute toward the delay in widespread adoption.

Embodiments disclosed herein can provide a dual-stack approach (e.g., using IPv4 and IPv6) that allows both users and communications service providers to migrate—in whole or in part—to the use of IPv6 in conjunction with edge locations. For example, embodiments can support users that currently utilize IPv4 and that may or may not want to transition to IPv6, or sophisticated users that just want to use IPv6. Additionally, or alternatively, embodiments can provide a clear segmented network benefit to edge location users who may want a well-defined path from an edge location to an adjacent CSP network (and optionally, to the broader internet) as well as a well-defined path back to the cloud provider network (and optionally, to the broader internet). For example, a CSP network may not want systems within an edge location to obtain internet connectivity through the CSP network, and thus, the edge location may provide internet connectivity through a separate path, e.g., through the cloud provider network. Moreover, embodiments can frugally use IPv6 addressing without wasting large amounts of address space—as edge locations are typically resource constrained and thus may not support large numbers of instances (and thus, may not need larger numbers of network addresses), embodiments can utilize large chunks of address space (which may be non-contiguous) and use them in a fine-grained manner, e.g., effectively on a per instance, per customer basis.

Figure 6:
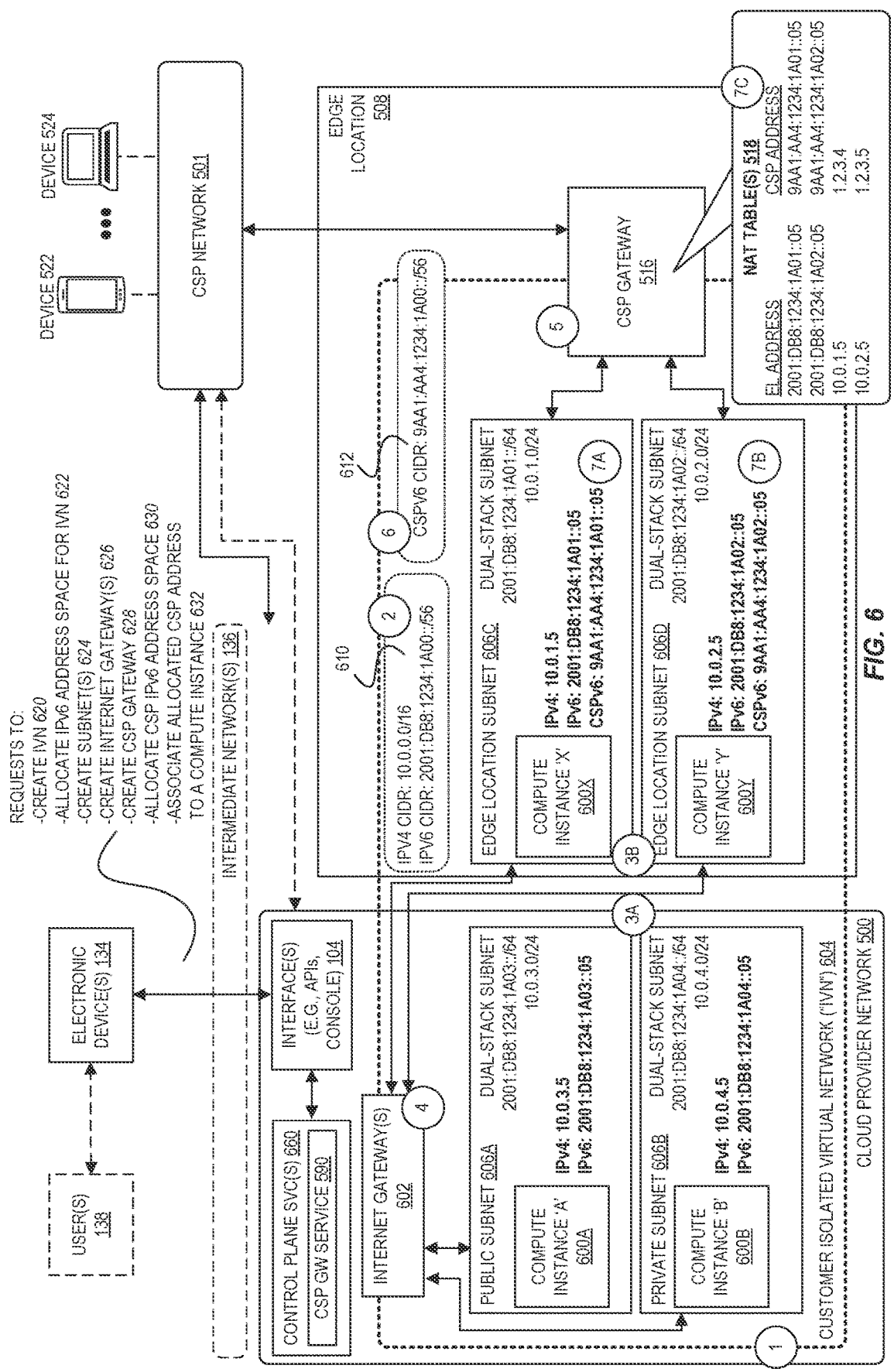
FIG. 6 is a diagram illustrating another implementation for connectivity between compute instances and communications service provider networks according to some embodiments.

In FIG. 6, a user 138 may wish to implement a system having some resources within the cloud provider network 500 (e.g., for complex processing and/or storage, non-latency sensitive operations, etc.) and some resources within one or more edge locations 508 (e.g., for latency sensitive operations). To implement such a system, the user 138 may cause an application executed by an electronic device 134 to send one or more requests 620 to create an isolated virtual network 604 ("IVN") at circle (1), which may span a region of the provider network 500 and one or more edge locations 508. This creation may include, by a control plane service 660, allocating IPv4 address space for the IVN—here shown as IPv4 CIDR 10.0.0.0/16 as part of 610 at circle (2).

The user may also cause electronic device 134 to send one or more requests 622 to allocate IPv6 address space for the IVN, though these requests may optionally be part of the creation of the IVN via requests 620. These IPv6 addresses—shown as 2001:DB8:1234:1A00:/15 within 610 at circle (2) —may come from a pool of IPv6 address space associated with the cloud provider network, and may be advertised by the cloud provider network (e.g., into other networks, such as the internet more generally) so that traffic destined to these addresses (from outside the provider network) are sent to the provider network, which may or may not actually pass that traffic to the IVN (depending on user configuration) as described herein. The allocation may be performed by a control plane service 660 of the provider network, e.g., a control plane entity of a hardware virtualization service.

The user may also cause electronic device 134 to send one or more requests 624 to create one or more subnets within the IVN as shown at circles (3A) and (3B) —here, reflected as a public subnet 606A and private subnet 606B in the region of the cloud provider network 500, and edge location subnets 606C and 606D within an edge location. This process may include assigning non-overlapping portions of the IVN 604 address spaces (e.g., address spaces 610) to the subnets 606—e.g., each subnet may be associated with a /24 CIDR of the /16 IVN CIDR block of IPv4 addresses, and/or be associated with a /64 block of the /56 IVN block of IPv6 addresses. The assignment may be performed by a control plane service 660 of the provider network, e.g., a control plane entity of a hardware virtualization service.

For example, the public subnet 606A is assigned the IPv4 block 10.0.3.0/24 as well as the IPv6 block 2001:DB8:1234:1A03:/64. Similarly, edge location subnet 606C is assigned the IPv4 block 10.0.1.0/24 as well as the IPv6 block 2001:DB8:1234:1A01:/64.

At this point, the IVN spans one or more AZs (via subnets 606A-606B) and one or more edge locations (via subnets 606C-606D), and thus resources to be created within the IVN may use these "private" addresses of this overlay network to communicate with each other. For example, in some embodiments the user may begin to launch instances 600 within these particular locations, which may be assigned addresses from the address blocks 610—e.g., instance 'A' 600A may have address 10.0.3.5 and 2001:DB8:1234:1A03:05; instance 'X' 600X may have address 10.0.1.5 and 2001:DB8:1234:1A01:05; etc.

At circle (4), the user may also cause electronic device 134 to send one or more requests 626 to create one or multiple internet gateways 602 associated with the IVN 604. The internet gateway(s) 602, in some embodiments provide a logical gateway that can be used by resources in the IVN 604 to reach the internet. For example, a general internet gateway may be created that allows inbound and outbound connection creation for ones of the instances/subnets (e.g., public subnet 606A and edge location subnet 606C) and/or an egress-only internet gateway that allows instances/subnets within the IVN 604 to establish connections to the broader internet but not for entities in the internet to establish connections to entities within the IVN (e.g., for private subnet 606B and edge location subnet 660D), which an allow these instances to obtain information/data they require, such as for system updates (e.g., for package management using applications like yum, apt, or the like). These requests may also involve creating network routes between ones of the subnets and the internet gateway(s) 602, e.g., one or more routes for public subnet 606A to an internet gateway, one or more routes for private subnet 606A to an egress-only internet gateway, etc., in non-illustrated subnet gateway router route-tables. The allocation may be performed by a control plane service 660 of the provider network, e.g., a control plane entity of a hardware virtualization service.

At this point, despite the edge location 508 being deployed "within" a site or location of the CSP network 501 (e.g., with a data center or other network site owned and/or operated by the CSP), instances using these addresses of the IVN block 610 may not have any connectivity with the CSP network 501, but instead have connectivity to other instances within the IVN 604 (e.g., by sending packets of this overlay network using an underlying substrate network connecting the various locations where the instances are physically running) subject to the user's configuration of the IVN 604 and various subnets 606.

As edge locations provide very low-latency connectivity to UE devices 522/524, the user will also want to allow for connectivity for instances 600X-600Y in the edge location 508. The user may cause electronic device 134 to send one or more requests 628 to create a CSP gateway 516 (e.g., a logical gateway between the edge location 508 and the CSP network 501) for the IVN 604 at circle (5), e.g., and create routes from the subnets 606C-606D (e.g., in non-illustrated subnet gateway router route-tables) to the CSP gateway 516, e.g., via a default route or a more specific route. These operations may be performed by a control plane service 660 of the provider network, e.g., the CSP GW service 590.

The user may also cause electronic device 134 to send one or more requests 630 to allocate a CSP IPv6 address space 612 for the IVN 640 from a pool of CSP-provided IPv6 addresses at circle (6) —here, a /56 CIDR block for 9AA1:AA4:1234:1A00:/56. As described herein, the CSP may provide a pool of IPv6 addresses to the provider for use within edge locations, which may be stored in a logically centralized location and portions thereof can be allocated to particular users. For example, the user 138 may request a particular address or block of addresses, and these addresses may be allocated/reserved for the use of that user. This may involve marking the addresses as used within a logically central datastore (e.g., by a CSP gateway service 590), and configuring the CSP gateway 516 to advertise routes to these addresses into the CSP network 501, e.g., via a routing protocol like the border gateway protocol (BGP).

The request(s) 630 to allocate a CSP IPv6 address space may be an API call with a name such as allocate-IPv6-nat-address, and may seek to allocate a CSPv6 block to the user's account or a specific IPv6 address from the CSPv6 pool. The request may identify a particular pool of addresses to pull from (e.g., using a—network-border-group parameter), and/or a specific address (using an—address parameter). A similar "release" command may also be supported, e.g., to place an address back into the pool as being available.

The user may also cause electronic device 134 to send one or more requests 632 to associate ones of these addresses to individual instances, e.g., associate a "CSPv6" address of 9AA1:AA4:1234:1A01:05 at circle (7A) to instance X 600X and 9AA1:AA4:1234:1A02:05 at circle (7B) to instance Y 600Y. In some embodiments, notably, these instances may not even be aware of this assignment, and continue sending and receiving traffic with the provider network "private" addresses (e.g., 10.0.2.5 and/or 2001:DB8:1234:1A02:05). However, traffic that is destined to the CSP network 501 (e.g., via a default route in the subnet router that directs traffic to the CSP gateway 516) from the instance 600Y will arrive at the CSP gateway 516 and be translated (e.g., via a type of Network Address Translation (NAT)) into the CSP-provided address for that instance.

For example, as shown at circle (7C), the association of a CSP-provided address with an instance may include updating a NAT table 518 mapping entry to associate a provider network "private" address (e.g., for instance Y 600Y, the address of 2001:DB8:1234:1A02:05) with its assigned CSP address (e.g., for instance Y 600Y, the address of 9AA1:AA4:1234:1A02:05). In some embodiments, this may be performed for one or multiple addresses associated with an instance, such as implementing NAT for both an IPv6 address as well as an IPv4 address. As shown, for instance Y 600Y an entry in NAT table(s) 518 may exist for both the "provider network IPv6 address" to "CSP IPv6 address" (2001:DB8:1234:1A02:05 to 9AA1:AA4:1234:1A02:05) and also the "provider network IPv4 address to CSP IPv4 address (10.0.2.5 to 1.2.3.5) mapping. The NAT table(s) 518 may thus be used by the CSP gateway 516 to thus translate the addresses back and forth without the instance being involved—e.g., outbound traffic going from the edge location 508 to the CSP network 501 may have its source address changed from the provider network address (or "EL address") into the CSP network address (or "CSP address"), and likewise the inbound traffic coming into the edge location 508 from the CSP network 501 may have its source address changed from the CSP network address (or "CSP address") into the provider network address (or "EL address"). These operations may be performed by a control plane service 660 of the provider network, e.g., the CSP GW service 590.

The request(s) 632 may be implemented as an associate-address-IPv6 API, and seek to associate a CSP address (allocated to the user's account) to a particular compute instance or network interface, and may include an identifier of an allocated network address (via an—allocation-id parameter) and/or an identifier of the targeted instance (via an—instance-id parameter) or network interface (via a—network-interface-id parameter). Similarly, a disassociate-IPv6-nat-address may also be supported allowing the user to disassociate an address from an instance or network interface.

Moreover, although this example shows a dual-stack approach for utilizing both IPv4 and IPv6 within the IVN 604, embodiments may also allow for only using IPv6 within the IVN 604 or even only using IPv6 within the IVN 604 (while still using IPv6 in the CSP network 501). Accordingly, embodiments can flexibly support a dual-stack configuration for users migrating from IPv4 to IPv6 (allowing some IPv4 systems to continue working as normal), or a single-stack configuration for either legacy users (e.g., only using IPv4) or advanced users (e.g., only using IPv6). In some embodiments, heterogeneous addressing (e.g., between instances within the IVN 604 and other devices outside of the edge location) may be supported via a NAT64-based approach, e.g., by configuring the CSP gateway 516 to map these different types of addresses. For example, an instance using IPv6 within the IVN 604 may wish to communicate with an IPv4-only server (e.g., in the broader internet or in the carrier network) and thus embed the IPv4 destination address into an IPv6 destination address (e.g., using a known technique such as the standard prefix of 64:ff9b::/96 combined with the specific IPv4 address within the IPv6 network segment, resulting in an IPv4-embedded IPv6 address) that can be handled by the CSP gateway 516.

Figure 7:
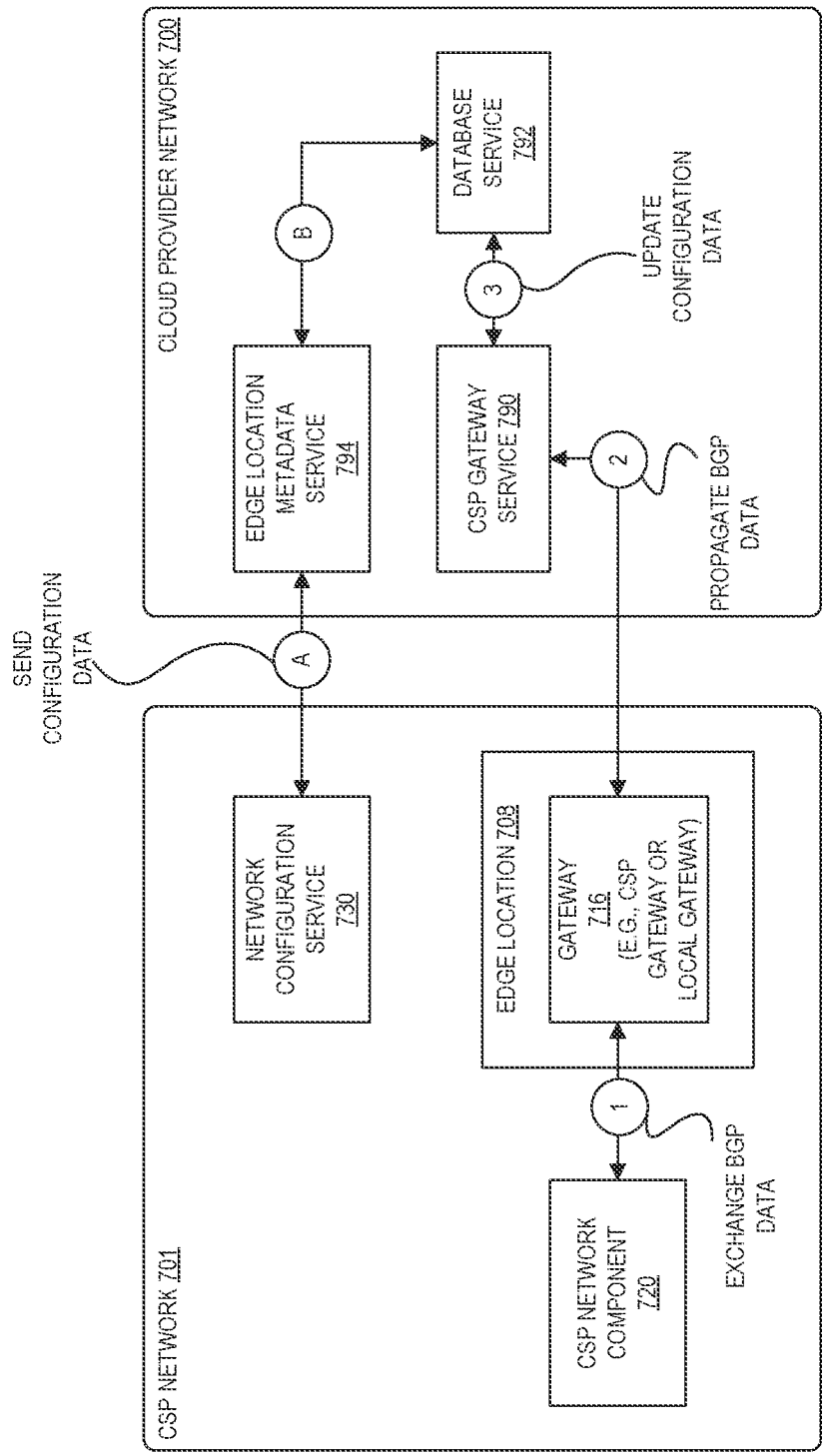
FIG. 7 is a diagram illustrating various approaches to obtaining edge location configuration data according to some embodiments.

FIG. 7 is a diagram illustrating various approaches to obtaining edge location configuration data according to some embodiments. As illustrated, a CSP network 701 includes an edge location 708. The edge location 708 includes a gateway 716 such as the CSP gateway 516 of FIG. 5 or the local gateway 616 of FIG. 6. A cloud provider network 700 includes a CSP gateway service 790 and a database service 792. As mentioned previously, the database service 792 (or other form of data store) can store configuration data for edge locations. Exemplary configuration data for a given edge location can include the IP address range of the CSP network from which IP addresses can be assigned to compute instances and network data for the various networks reachable from a given edge location. Such network data can include an identity of the reachable network(s) and how to reach those networks (e.g., a target router or gateway, how to reach that target, etc.).

In some embodiments, data exchanged in a BGP session between a gateway of an edge location and a network component of a CSP network is propagated to the cloud provider network to store as part of configuration data. The numbered circles "1" through "3" illustrate an exemplary process to update the configuration data in this manner. At circle "1" in FIG. 7, the gateway 716 establishes a BGP session(s) with autonomous nodes of the CSP network (e.g., a CSP network component 720) to exchange network configuration data. Such data can include information such as routing data (e.g., a target for various address ranges) and networking details (e.g., tags such as vlan tags). At circle "2" in FIG. 7, the gateway 716 propagates at least a portion of the received data to the CSP gateway service 790. At circle "3" in FIG. 7, the CSP gateway service 790 updates the configuration data for the edge location 708 via the database service 792.

In some embodiments, the CSP network 701 can include a network configuration service 730 that sends configuration data to an edge location metadata service 794 of the cloud provider network 700. The edge location metadata service 794 can include an API (e.g., part of interface 104) that accepts configuration data from network configuration services of a many different networks according to some form of structured exchange formation (e.g., JSON, XML). Such a technique can be used in place of the BGP data propagation described above or in addition to it (e.g., to exchange configuration data not handled via BGP). The circles "A" through "B" illustrate an exemplary process to update the configuration data in this manner. At circle "A" in FIG. 7, the network configuration service 730 sends the configuration data to the edge location metadata service 794, which in turn updates the configuration data via the database service 792 as indicated at circle "B" of FIG. 7.

Figure 8:
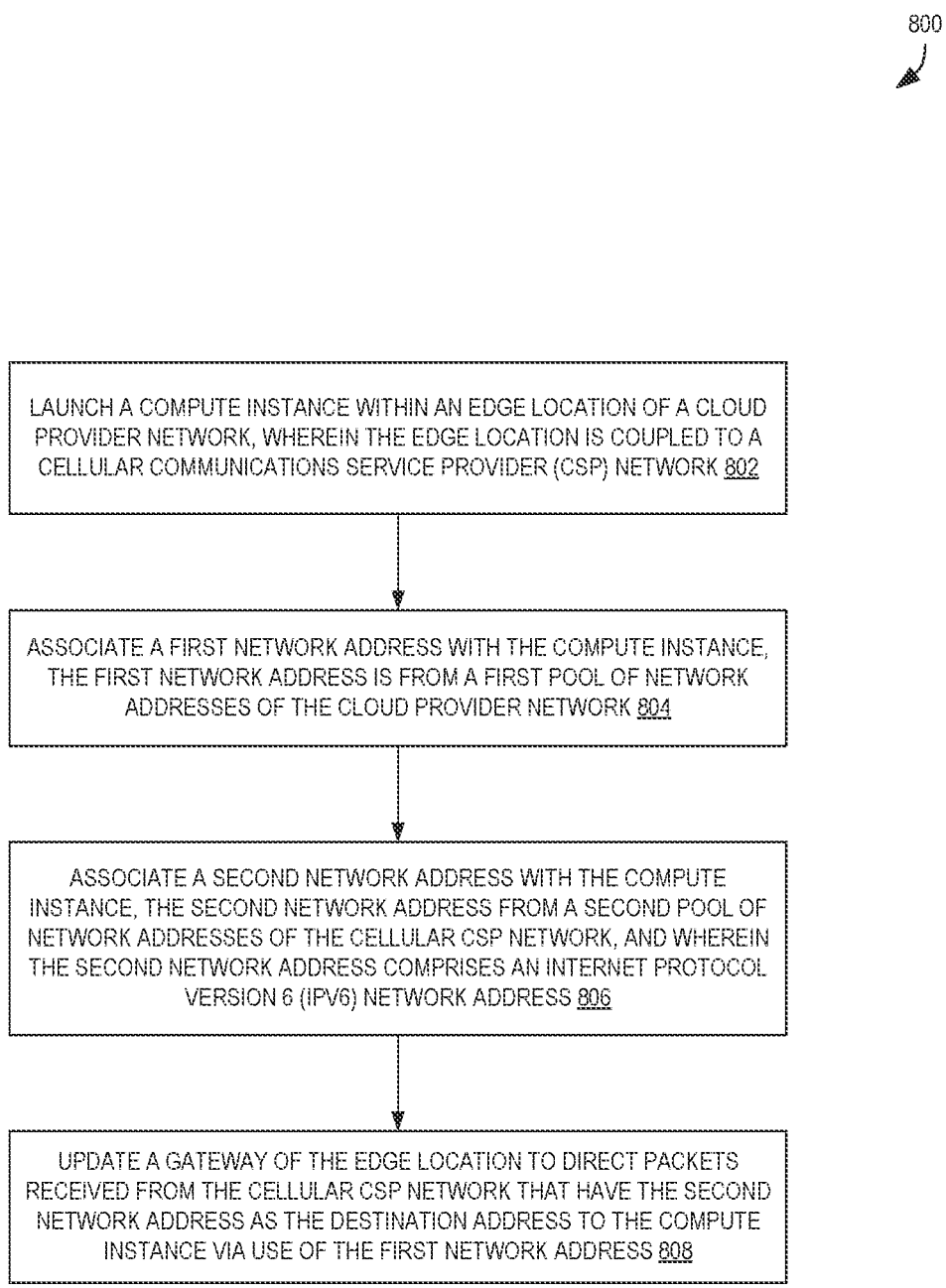
FIG. 8 is a flow diagram illustrating operations of a method for dual-stack network addressing in cloud provider network edge locations according to some embodiments.

FIG. 8 is a flow diagram illustrating operations 800 of a method for dual-stack network addressing in cloud provider network edge locations according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by one or more control plane services 660 of the other figures, e.g., CSP gateway service 590, a hardware virtualization service control plane service, etc.

The operations 800 include, at block 802, launching a compute instance within an edge location of a cloud provider network, wherein the edge location is coupled to a cellular communications service provider (CSP) network. The edge location may include one or more server computing devices to host resources (e.g., compute instances) on behalf of users of the cloud provider network. The edge location may be deployed within a location (e.g., a site, facility, data center, etc.) owned or managed by the cellular CSP, and may be directly coupled (e.g., via border routers) to the cellular CSP network. The compute instance may be launched into a subnet created by the cloud provider network, which may have associated therewith one or more cloud provider network address blocks (e.g., IPv4 and/or IPv6 blocks). The subnet may operate within an isolated virtual network, which may also include other subnets, each using a portion of a network address space of the isolated virtual network.

The operations 800 further include, at block 804, associating a first network address with the compute instance, the first network address is from a first pool of network addresses of the cloud provider network. This block 804 may be performed responsive to a user request received at the cloud provider network (e.g., within a region of the cloud provider network), and may include updating a database (e.g., within the region) to indicate the assignment of the first network address to the compute instance, and/or sending commands to the edge location to cause the compute instance to utilize the first network address. The first network address may be an IPv4 or IPv6 address from the first pool of network addresses, and may be advertised from the region (i.e., and not from the edge location where it is being used).

The operations 800 further include, at block 806, associating a second network address with the compute instance, the second network address from a second pool of network addresses of the cellular CSP network, and wherein the second network address comprises an Internet Protocol version 6 (IPv6) network address. This block 806 may be performed responsive to a user request received at the cloud provider network (e.g., within a region of the cloud provider network), and may include updating a database (e.g., within the region) to indicate the association of the second network address to the compute instance.

The operations 800 further include, at block 808, updating a gateway of the edge location to direct packets received from the cellular CSP network that have the second network address as the destination address to the compute instance via use of the first network address. Block 808 may include sending one or more commands, from a control plane entity of the cloud provider network, to the edge location to cause a communication service provider gateway to be updated with a mapping (e.g., for a NAT table) between the first network address and the second network address.

Figure 9:
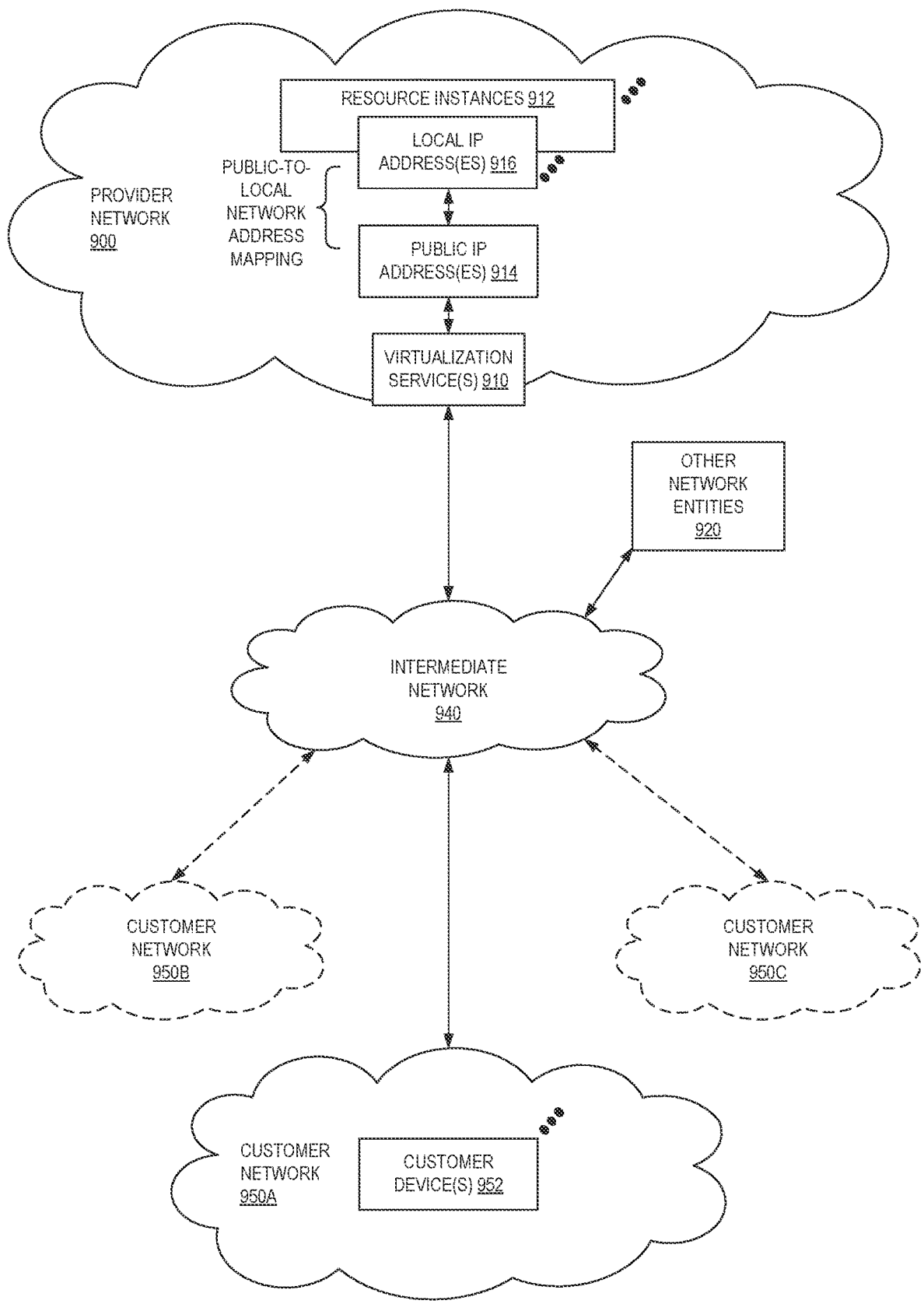
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
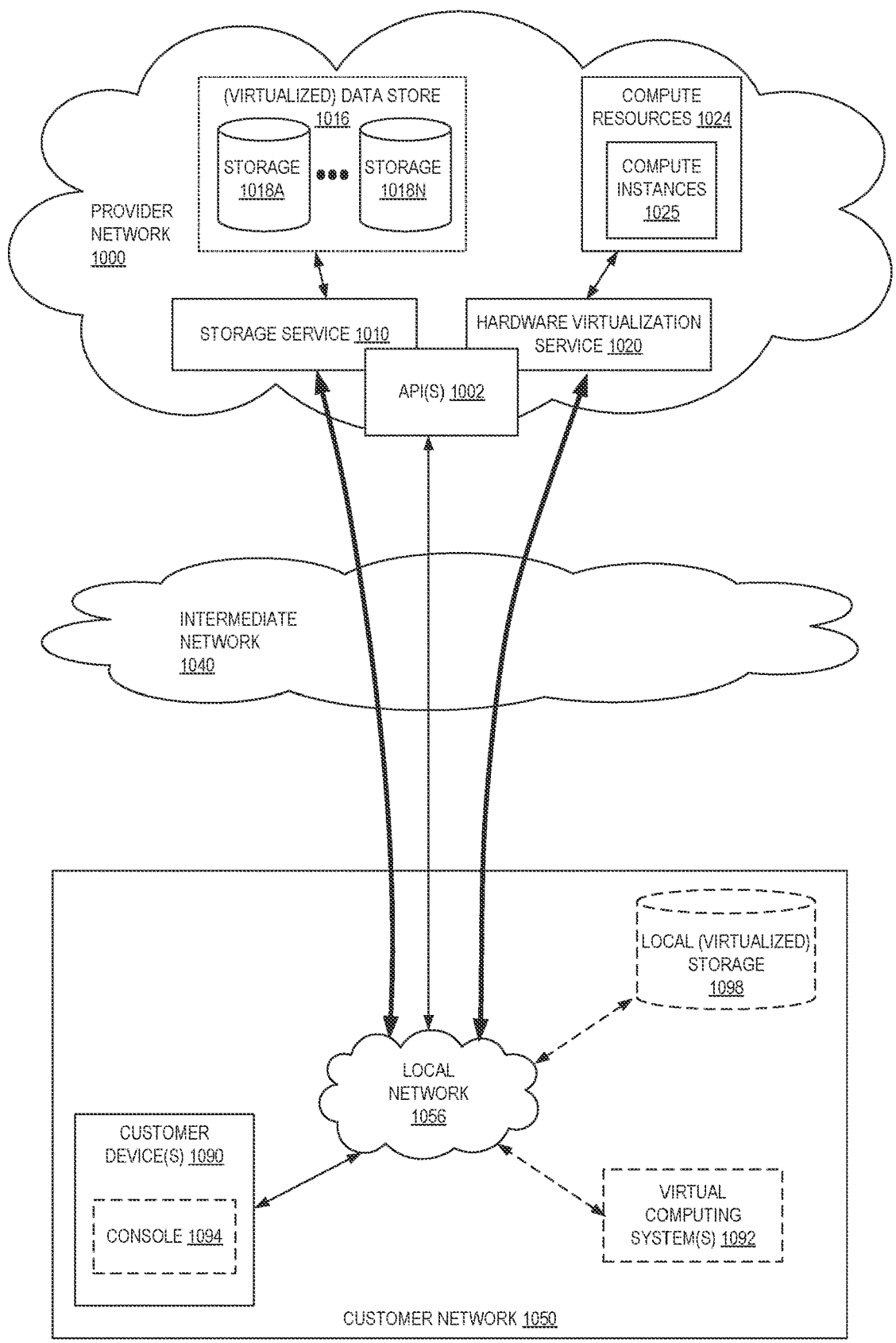
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Figure 11:
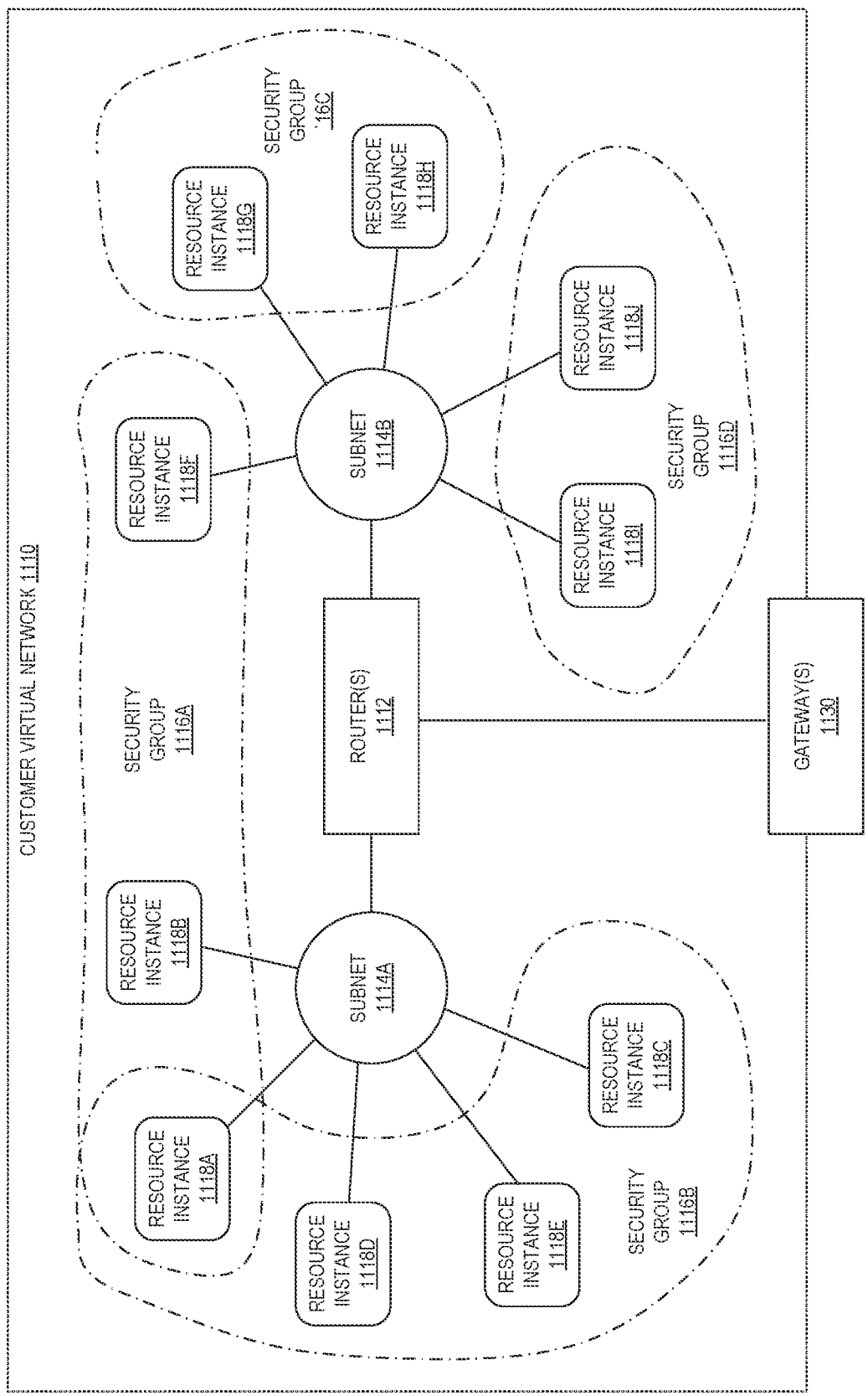
FIG. 11 illustrates subnets and security groups in an example virtual network on a provider network according to some embodiments.

FIG. 11 illustrates subnets and security groups in an example virtual network 1110 on a provider network, according to some embodiments. In some embodiments, a provider network may allow the customer to establish and manage virtual security groups 1116 (e.g., 1116A-1116D) within the customer's virtual network 1110, within or across subnets 1114. A security group 1116 is a logical grouping of resource instances 1118 and acts as a virtual firewall that controls the traffic allowed to reach one or more resource instances 1118 within the security group 1116 according to security group rules. The customer may establish one or more security groups 1116 within the virtual network 1110 and may associate each resource instance 1118 in the virtual network 1110 with one or more of the security groups 1116. In some embodiments, the customer may establish and/or modify rules for each security group 1116 that control the inbound traffic allowed to reach the resource instances 1118 associated with the security group 1116.

In the example virtual network 1110 shown in FIG. 11, the virtual network 1110 is subdivided into two subnets 1114A and 1114B. Access to the virtual network 1110 is controlled by gateway(s) 1130. Each subnet 1114 may include at least one router 1112 that acts to route traffic to (and from) resource instances 1118 on the respective subnet 1114. In some embodiments, network access control lists (ACLs) may be used to control access to the subnets 1114 at router(s) 1112. In the example shown in FIG. 11, resource instances 1118A through 1118E are on subnet 1114A, and resource instances 1118F through 1118J are on subnet 1114B. The customer has established four security groups 1116A through 1116D. As shown in FIG. 11, a security group may extend across subnets 1114, as does security group 1116A that includes resource instances 1118A and 1118B on subnet 1114A and resource instance 1118F on subnet 1114B. In addition, a resource instance 1118 may be included in two or more security groups 1116, as is resource instance 1118A which is included in security group 1116A and 1116B.

Illustrative Systems

Figure 12:
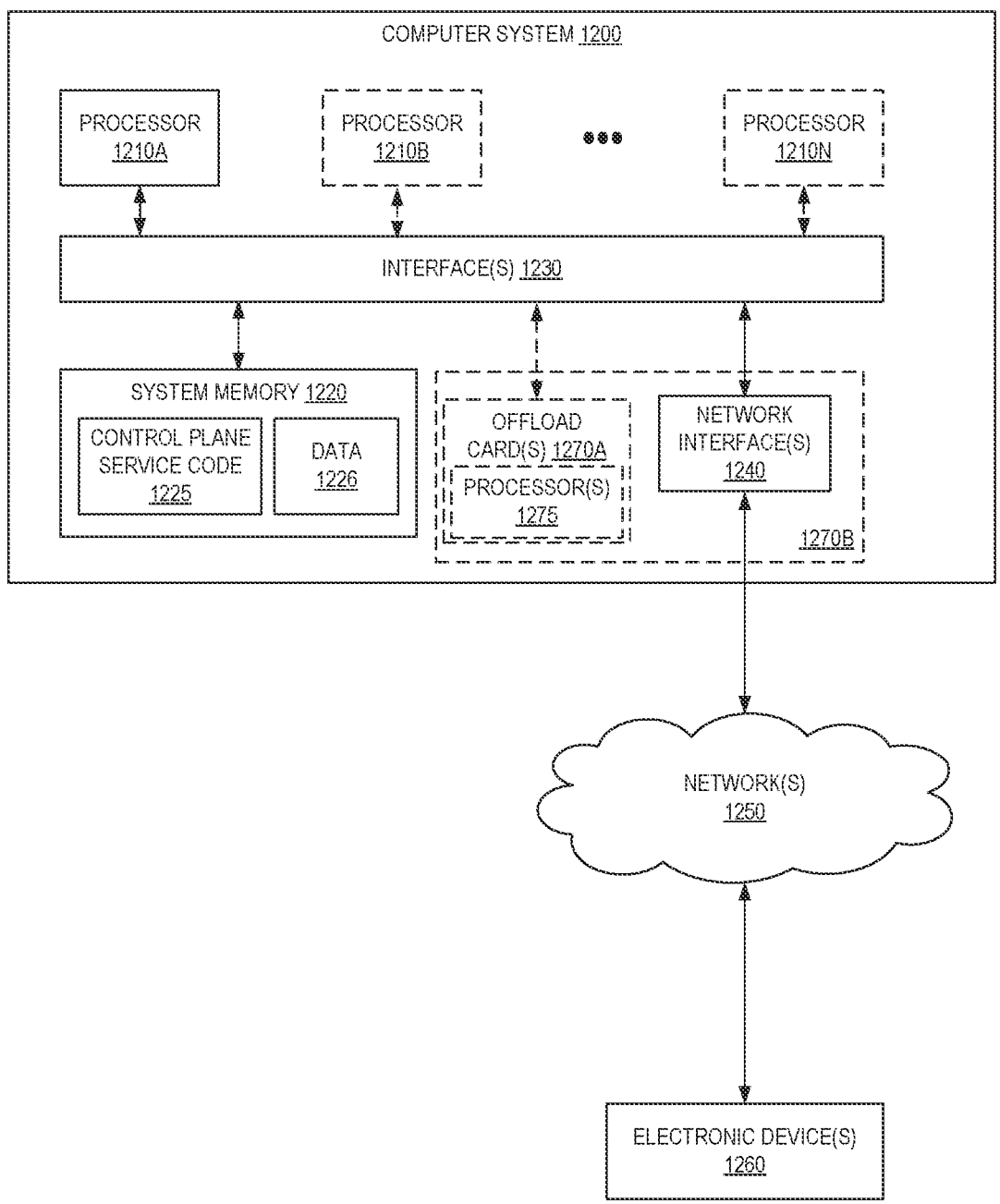
FIG. 12 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1200 illustrated in FIG. 12. In the illustrated embodiment, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various embodiments a computer system 1200 may include one computing device or any number of computing devices configured to work together as a single computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various embodiments, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1220 as control plane service code 1225 (e.g., executable to implement, in whole or in part, a control plane service 660 such as CSP gateway service 590) and data 1226.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1200 includes one or more offload cards 1270A or 1270B (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1200 may act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some embodiments the offload card(s) 1270A or 1270B can perform compute instance management operations such as pausing and/or un-pausing compute instances, launching and/or terminating compute instances, performing memory transfer/copying operations, etc. These management operations may, in some embodiments, be performed by the offload card(s) 1270A or 1270B in coordination with a hypervisor (e.g., upon a request from a hypervisor) that is executed by the other processors 1210A-1210N of the computer system 1200. However, in some embodiments the virtualization manager implemented by the offload card(s) 1270A or 1270B can accommodate requests from other entities (e.g., from compute instances themselves), and may not coordinate with (or service) any separate hypervisor.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Further, in the description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other and thus may be communicatively coupled when they are in some manner of communication with each other. "Connected" is used to indicate the establishment of communication between two or more elements that are coupled with each other.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
hosting a compute instance within an edge location of a cloud provider network, wherein the compute instance is associated with a first network address of the cloud provider network, wherein the first network address comprises an Internet Protocol version 6 (IPv6) address, and wherein the edge location is controlled at least in part by a control plane of the cloud provider network, is communicatively coupled with a cellular communications service provider (CSP) network, and is deployed within a facility of the cellular CSP network;
receiving, at the cloud provider network, a customer request to associate a network address of the cellular CSP network with the compute instance;
associating a second network address with the compute instance, the second network address from a pool of network addresses of the cellular CSP network, wherein the second network address comprises another IPv6 address; and
updating a gateway of the edge location to direct packets received from the cellular CSP network that are addressed to the second network address to the compute instance.

2. The computer-implemented method of claim 1, wherein updating the gateway comprises updating a network address translation (NAT) data structure to include a mapping between the first network address of the cloud provider network and the second network address of the cellular CSP network.

3. The computer-implemented method of claim 1, wherein the compute instance is further associated with a third network address, wherein the third network address comprises an Internet Protocol version 4 (IPv4) address of the cloud provider network.

4. A computer-implemented method comprising:
launching a compute instance within an edge location of a cloud provider network, wherein the edge location is coupled to a cellular communications service provider (CSP) network;

associating a first network address with the compute instance, the first network address is from a first pool of network addresses of the cloud provider network;

associating a second network address with the compute instance, the second network address from a second pool of network addresses of the cellular CSP network, and wherein the second network address comprises an Internet Protocol version 6 (IPv6) network address; and updating a gateway of the edge location to direct packets received from the cellular CSP network that have the second network address as the destination address to the compute instance via use of the first network address.

5. The computer-implemented method of claim 4, further comprising updating the gateway of the edge location to direct packets addressed to network addresses of the cellular CSP network that are outside of the second pool of network addresses into the cellular CSP network.

6. The computer-implemented method of claim 4, wherein the first network address is utilized within an isolated virtual network of the cloud provider network, and wherein updating the gateway to direct the packets having the second network address as the destination address comprises replacing the second network address with the first network address.

7. The computer-implemented method of claim 6, wherein the first network address is also an IPv6 network address, and wherein the method further comprises:
associating a third network address, from a second pool of network addresses of the cloud provider network, with the compute instance, wherein the third network address comprises an Internet Protocol version 4 (IPv4) network address.

8. The computer-implemented method of claim 7, further comprising configuring the edge location to transmit a packet originated by the compute instance that has the third network address as a source address and a fourth network address, from the second pool of network addresses of the cloud provider network, as a destination address to a second compute instance within a same isolated virtual network, wherein the second compute instance is executed within the edge location, within another edge location of the cloud provider network, or within a region of the cloud provider network.

9. The computer-implemented method of claim 7, wherein the compute instance is not directly reachable via use of the first network address or the third network address from the cellular CSP network.

10. The computer-implemented method of claim 4, wherein the first pool of network addresses are advertised, using a routing protocol, by a region of the cloud provider network.

11. The computer-implemented method of claim 4, further comprising:
receiving, at the cloud provider network, a request to allocate a block of IPv6 addresses, of the cellular CSP network, to an account of a user of the cloud provider network; and
receiving, at the cloud provider network, a request to associate the second network address, from the block of IPv6 addresses, with the compute instance in the edge location.

12. The computer-implemented method of claim 4, further comprising:
associating another network address, from the first pool of network addresses, with a second compute instance executed within a region of the cloud provider network or within a second edge location of the cloud provider network,
wherein the compute instance and the second compute instance are both part of a same isolated virtual network, and
wherein the first pool of network addresses is associated with the isolated virtual network.

13. A system comprising:
a first one or more electronic devices at an edge location of a cloud provider network to host compute instances for customers of the cloud provider network, the edge location being communicatively coupled with a cellular communications service provider (CSP) network;
a second one or more electronic devices of the cloud provider network to implement one or more control plane services, the one or more control plane services including instructions that upon execution cause the one or more control plane services to:
cause a compute instance to be launched within the edge location on behalf of a customer;
associate a first network address with the compute instance, wherein the first network address is from a first pool of network addresses of the cloud provider network;
associate a second network address with the compute instance, wherein the second network address is from a second pool of network addresses of the cellular CSP network, and wherein the second network address comprises an Internet Protocol version 6 (IPv6) network address; and
update a gateway of the edge location to direct packets received from the cellular CSP network that have the second network address as the destination address to the compute instance via use of the first network address.

14. The system of claim 13, wherein the one or more control plane services further include instructions that upon execution cause the one or more control plane services to:
update the gateway of the edge location to direct packets addressed to network addresses of the cellular CSP network that are outside of the second pool of network addresses into the cellular CSP network.

15. The system of claim 13, wherein the first network address is utilized within an isolated virtual network of the cloud provider network, and wherein to update the gateway to direct the packets having the second network address as the destination address, the one or more control plane services are to cause the second network address to be replaced with the first network address in those packets.

16. The system of claim 15, wherein the first network address is also an IPv6 network address, and wherein the one or more control plane services further include instructions that upon execution cause the one or more control plane services to:
associate a third network address, from a second pool of network addresses of the cloud provider network, with the compute instance, wherein the third network address comprises an Internet Protocol version 4 (IPv4) network address.

17. The system of claim 16, wherein the compute instance is not directly reachable via use of the first network address or the third network address from the cellular CSP network.

18. The system of claim 13, wherein the one or more control plane services further include instructions that upon execution cause the one or more control plane services to:

receive a request to allocate a block of IPv6 addresses, of the cellular CSP network, to an account of a user of the cloud provider network; and receive a request to associate the second network address, from the block of IPv6 addresses, with the compute instance in the edge location.

19. The system of claim 13, wherein the one or more control plane services further include instructions that upon execution cause the one or more control plane services to:

associate another network address, from the first pool of network addresses, with a second compute instance executed within a region of the cloud provider network or within a second edge location of the cloud provider network, wherein the compute instance and the second compute instance are both part of a same isolated virtual network, and wherein the first pool of network addresses is associated with the isolated virtual network.

20. The system of claim 13, wherein the first pool of network addresses is a /56 Classless Inter-Domain Routing (CIDR) block, and wherein the compute instance operates within a subnet of an isolated virtual network that includes a /64 CIDR block from the /56 CIDR block.

* * * * *